(No Model.)

O. S. WARD.
ANIMAL TRAP.

No. 488,232. Patented Dec. 20, 1892.

Witnesses

Wm. A. Schoenborn

Inventor

O. S. Ward.

By his Attorneys,

C. A. Snow & Co.

UNITED STATES PATENT OFFICE.

ORING SMITH WARD, OF LOS GATOS, CALIFORNIA.

ANIMAL-TRAP.

SPECIFICATION forming part of Letters Patent No. 488,232, dated December 20, 1892.

Application filed July 6, 1892. Serial No. 439,139. (No model.)

*To all whom it may concern:*

Be it known that I, ORING SMITH WARD, a citizen of the United States, residing at Los Gatos, in the county of Santa Clara and State of California, have invented a new and useful Animal-Trap, of which the following is a specification.

This invention relates to improvements in traps for animals.

The object of the present invention is to provide a simple and inexpensive trap for animals such as squirrels, gophers and the like, adapted to securely retain an animal after being sprung and capable of being readily set.

The invention consists in the construction and novel combination and arrangement of parts hereinafter fully described, illustrated in the accompanying drawings and pointed out in the appended claims.

Figure 1:
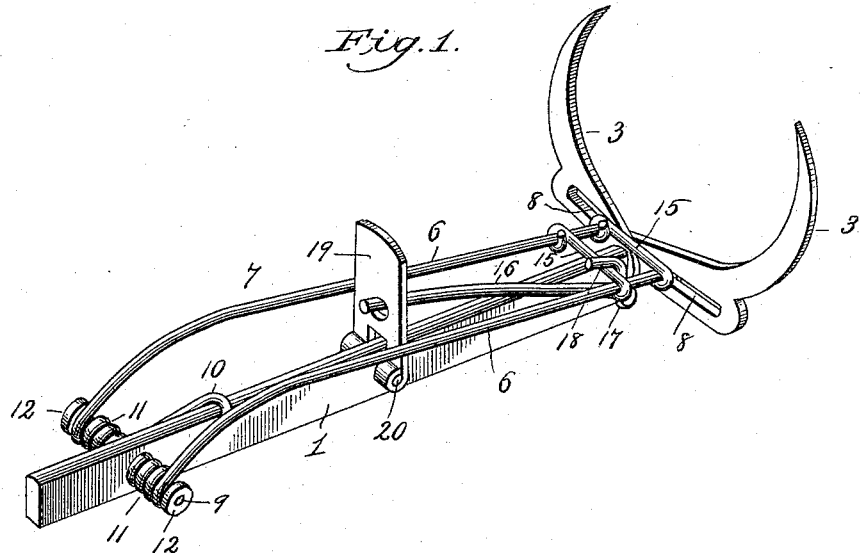
Figure 2:
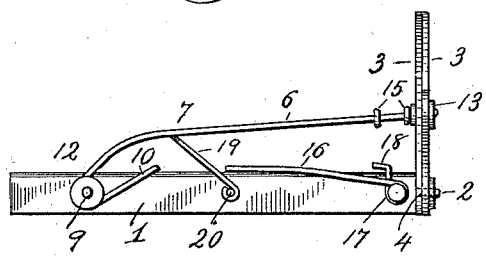

In the accompanying drawings;—Figure 1 is a perspective view of a trap constructed in accordance with this invention, illustrating the position of the parts when set. Fig. 2 is a side elevation, the trap being sprung.

Like numerals of reference indicate corresponding parts in both figures of the drawings.

1 designates a bar which has one end reduced to form a pivot 2 on which is mounted the inner ends of curved jaws 3 which are provided with eyes 4 to receive the pivot and which are actuated in closing by arms 6 of a spring 7. The curved jaws 3 are provided at their inner portions with longitudinal slots 8 in which are arranged the outer ends of the spring-actuated arm 6, whereby when the jaws are opened or spread, the spring arms will be bent downward and will, when the trap is sprung, spring upward to close the jaws. The slots in which the spring arms move enable the leverage of the arms to be increased as the spring moves outward and the force of the same decreases, thereby causing an animal to be securely held when the trap is sprung and the arms are closed, whether the animal caught be large or small.

The spring is constructed of spring wire and is mounted on a transverse pin 9 and consists of a central loop 10 receiving the bar 1 and side coils 11, arranged on the pin 9 and secured on the same by disks or washers 12. The spring arms are provided at their outer ends with disks 13 which form stops to prevent the jaws becoming disengaged from the spring arm, and the latter are connected near their ends with cross pieces 15 which strengthen and support the arms at their outer ends. The trap is set by means of a trigger 16 which extends along the bar and is provided at one end with an eye 17 and a hook 18 adapted to engage one of the cross bars 15 to hold the spring arms down upon the bar 1. The other end of the trigger is engaged by a plate 19 which has its inner end bifurcated and provided with eyes through which passes a pintle 20 which hinges the plate to the bar. The plate is provided at its center with an opening to receive the trigger and is adapted to be moved backward from the jaws to spring the trap. The plate when the trap is set is disposed in a vertical position but may if desired be bent into any other position.

What I claim is;—

1. In a trap the combination of a bar, curved jaws pivoted at their inner ends to the same and provided with longitudinal slots, spring-actuated arms arranged in the slots and adapted to move in the same, and loosely engaging the jaws to close the jaws, and means for setting the trap, substantially as described.

2. In a trap, the combination of a bar, curved jaws pivotally secured to the bar and provided with longitudinal slots, a spring mounted on the bar and comprising a central loop, side coils and spring arms engaging the openings of the jaws, and means for setting the trap, substantially as described.

3. In a trap, the combination of a bar, curved jaws pivotally secured to the same and provided with longitudinal slots, a spring mounted on the bar and having spring arms engaging the slots, a cross-bar connecting the arms, a trigger mounted on the bar and provided with a hook to engage the cross-bar, and a plate hinged to the bar and provided with an opening to receive the trigger, substantially as described.

4. In a trap the combination of a bar, curved jaws pivotally secured to the same and provided with longitudinal slots, a transverse pin mounted on the bar, the spring provided with a central loop receiving the bar and having side coils disposed on the transverse pin and having arms engaging the slots of the jaws, cross bars connecting the spring arms, a trigger provided with an eye and pivotally mounted on the bar and having a hook to engage one of said cross-bars and a plate hinged to the bar and provided with an opening to receive the trigger, substantially as described.

In testimony that I claim the foregoing as my own I have hereto affixed my signature in the presence of two witnesses.

ORING SMITH WARD.

Witnesses:
  B. H. NOBLE,
  E. S. WARD.